United States Patent [19]
Beard et al.

[11] Patent Number: 5,165,038
[45] Date of Patent: Nov. 17, 1992

[54] GLOBAL REGISTERS FOR A MULTIPROCESSOR SYSTEM

[75] Inventors: Douglas R. Beard, Eleva; George A. Spix; Edward C. Miller, both of Eau Claire, all of Wis.; Robert E. Strout, II, Livermore, Calif.; Anthony R. Schooler, Eau Claire, Wis.; Alexander A. Silbey, Eau Claire, Wis.; Brian D. Vanderwarn, Eau claire, Wis.; Jimmie R. Wilson, Eau claire, Wis.; Richard E. Hessel, Altoona, Wis.; Andrew E. Phelps, Eau Claire, Wis.

[73] Assignee: Supercomputer Systems Limited Partnership, Eau Claire, Wis.

[21] Appl. No.: 536,198

[22] Filed: Jun. 11, 1990

Related U.S. Application Data

[63] Continuation-in-part of Ser. No. 459,083, Dec. 29, 1989.

[51] Int. Cl.⁵ .................. G06F 13/26; G06F 15/16
[52] U.S. Cl. ................... 395/800; 364/931.4; 364/941.2; 364/229; 364/241.3; 364/281.3
[58] Field of Search ................ 364/DIG. 1, DIG. 2; 395/700, 800

[56] References Cited

U.S. PATENT DOCUMENTS

| | | | |
|---|---|---|---|
| 3,308,436 | 3/1967 | Borck | 364/200 |
| 3,970,993 | 7/1976 | Finnila | 364/200 |
| 4,015,243 | 3/1977 | Kurpanek et al. | 395/325 |
| 4,240,143 | 12/1980 | Besemer | 395/325 |
| 4,523,273 | 6/1985 | Adams | 364/200 |
| 4,814,980 | 3/1989 | Peterson | 395/200 |
| 4,924,380 | 5/1990 | McKinney | 395/325 |

*Primary Examiner*—David Y. Eng
*Attorney, Agent, or Firm*—Patterson & Keough

[57] ABSTRACT

Global registers for a multiprocessor system support multiple parallel access paths for simultaneous operations on separate sets of global registers, each set of global registers referred to as a global register file. An arbitration mechanism associated with the global registers is used for resolving multiple, simultaneous requests to a single global register file. An arithmetic and logical unit (ALU) is also associated with each global register file for allowing atomic arithmetic operations to be performed on the entire register value for any of the global registers in that global register file.

12 Claims, 11 Drawing Sheets

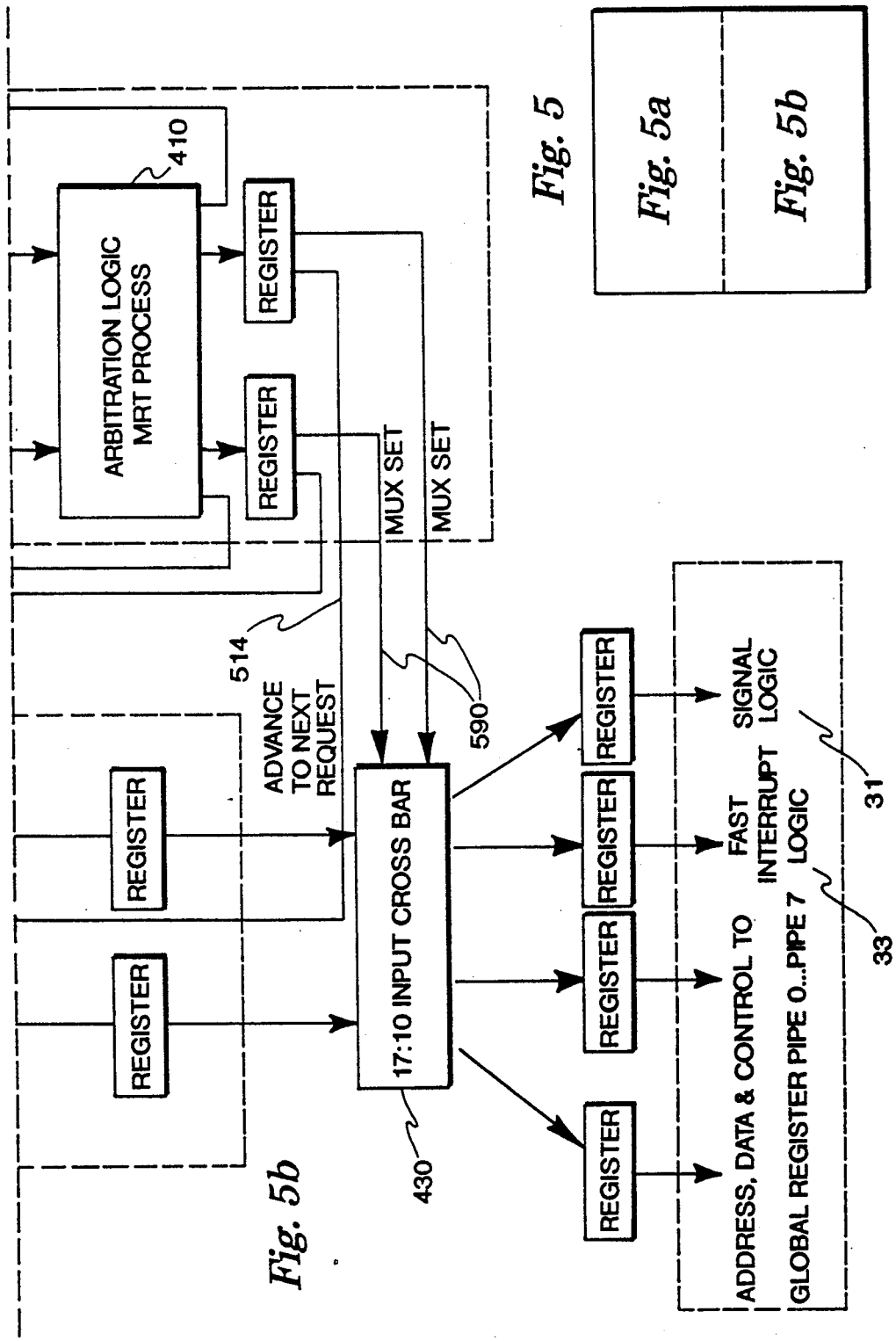

PHYSICAL ADDRESS MAP AS USED AT THE NRCA AND AT THE I/O CONCENTRATOR MEANS

GLOBAL REGISTERS FOR A MULTIPROCESSOR SYSTEM

RELATED APPLICATIONS

This application is a continuation-in-part of an application filed in the United States Patent and Trademark Office on Dec. 29, 1989, entitled CLUSTER ARCHITECTURE FOR A HIGHLY PARALLEL SCALAR/VECTOR MULTIPROCESSOR SYSTEM, U.S. Ser. No. 07/459,083, and assigned to the assignee of the present invention, which is hereby incorporated by reference in the present application.

This application is also relates to copending application filed in the United States Patent and Trademark Office concurrently herewith, entitled, DISTRIBUTED INPUT/OUTPUT ARCHITECTURE FOR A MULTIPROCESSOR SYSTEM, Ser. No. 07/536,186, which is assigned to the assignee of the present invention, and a copy of which is attached and hereby incorporated in the present application.

TECHNICAL FIELD

This invention relates generally to the field of registers and interconnection techniques for multiprocessor coupler and electronic logic systems. More particularly, the present invention relates to a system of global registers for a multiprocessor system that provides for an efficient and distributed mechanism that is capable of providing an atomic resource allocation mechanism for interconnecting and coordinating the multiprocessors in such a system.

BACKGROUND ART

The use of global registers as part of the interconnection and control mechanisms for multiprocessor systems is well known in the prior art. Global registers are registers that are generally accessible to all requestors in a multiprocessor system. In an article by E. W. Dijkstra entitled "Co-operating Sequential Processes," in F. Genuys (ed.), *Programming Languages* (Academic Press, New York 1968), Dijkstra describes the use of global registers for a semaphore operation to control the operational flow of a multiprocessor system. The use of global registers as part of a semaphore operation is typically limited to minimally parallel supercomputers and hierarchical memory supercomputers. Massively parallel supercomputers, by their very architecture, do not have a use for a set of global registers as control and coordination of the processors is accomplished via a message passing scheme.

Most prior art global register systems utilize some form of hardware dependent interlock mechanism to accomplish the semaphore function. For example, in the architecture for the Cray X-MP supercomputer developed by Cray Research, Inc., that is the subject of U.S. Pat. No. 4,636,942, a deadlock interrupt means is used to coordinate requires to the global registers by two high-speed processors. While this type of tightly-coupled direct-connection method is an efficient means for coordinating two high speed processors, the hardware deadlock interrupt mechanism described in that patent is mots effective when both the number of processors being coupled together and the number of global registers involved are relatively small.

In addition, most prior art global register systems have been implemented using a small set of global registers with relatively few access paths. Because minimally parallel supercomputers typically operate with a centralized operating system, many of the potential conflicts for global register usage are controlled by the centralized operating system which can limit the number of processors assigned to access a given global register. As a result, there has generally been no need in the prior art to provide for a large number of global registers capable of distributed and/or multithreaded processing on the contents of more than one global register at a time.

The design of global registers for supercomputers has been problematic in prior art multiprocessor systems, even with the limited design requirements of those architectures. In an effort to increase the processing speed and flexibility of multiprocessor computer processing systems, the previously identified parent application to the present invention. U.S. Ser. No. 07/459,083, provides a cluster architecture that allows a number of processors and external interface ports to make multiple and simultaneous requests to a common set of shared hardware resources. One of those shared hardware resources is a set of global registers. The problem of global register design is further compounded by several important design factors that are utilized in the design of this cluster architecture. First, the global registers must be capable of supporting many multiple requests to the same global register. Second, the global registers must operate in a distribute environment where there is no central scheduler and where portions of the distributed input/output are also allowed direct access to the global registers without processor intervention. Finally, the global registers must be capable of atomic arithmetic operations and atomic resource allocations operations in order to support the software routines for a multithreaded operating system that use shared-variable synchronization and anarchy-based scheduling to allocate work and coordinate access to common data structures used by the operating system.

The problem of global register design has generally been managed in prior art supercomputers by assigning a single, central scheduling processor to keep track of what resources were currently being used by which processor. In the distributed access architecture of the cluster architecture for a multiprocessor system, access to all shared resources, including global registers, is equal and democratic and there is no central scheduler. Consequently, a new design for global registers for a distributed access architecture multiprocessor system is needed.

SUMMARY OF THE INVENTION

The present invention provides for global registers for a multiprocessor system that will support multiple parallel access paths for simultaneous operations on separate sets of global registers, each set of global registers being referred to as a global register file. An arbitration mechanism associated with the global registers is used for resolving multiple, simultaneous requests to a single global register file. An arithmetic and logical unit (ALU) is also associated with each global register file for allowing atomic arithmetic operations to be performed on the entire register value for any of the global registers in that global register file.

The global registers of the present invention are a globally accessible resource that may be accessed from any processor or peripheral controller through an external interface port in the multiprocessor system. The global registers support variety of synchronization primitives to allow the most efficient choice for synchronization primitive, depending upon the particular synchronization task at hand. One of the more notable synchronization primitives of the present invention is the Fetch and Conditional Add (FCA) instruction. The FCA instruction may be used by the software routines for a multithreaded operating system that uses shared-variable synchronization and anarchy-based scheduling to allocate work and coordinate access to common data structures used by the operating system.

In the preferred embodiment, the global registers are implemented as one part of an entire set of common shared hardware resources that are all available to each requestor in a distributed, democratic multiprocessor environment. The global registers are organized as eight global register files within each cluster of the preferred embodiment of the multiprocessor system. The organization of the global registers of the present invention into global register files allows simultaneous access to multiple global register files. In the preferred embodiment, there are 8192 global registers per cluster and 1024 global registers per global register file.

It is an objective of the present invention to provide a set of global registers that will support multiple parallel access paths for simultaneous operations on separate global register files.

Another object of the present invention is to provide a set of global registers that allow atomic arithmetic operation to be perfomred on the entire register value for any of the global registers.

A further objective of the present invention is to provide a set of global registers that are capable of supporting a Fetch and Conditional Add (FCA) instruction.

These and other objectives of the present invention will become apparent with reference to the drawings, the detailed description of the preferred embodiment and the appended claims.

DESCRIPTION OF THE PREFERRED EMBODIMENTS

Figure 1:
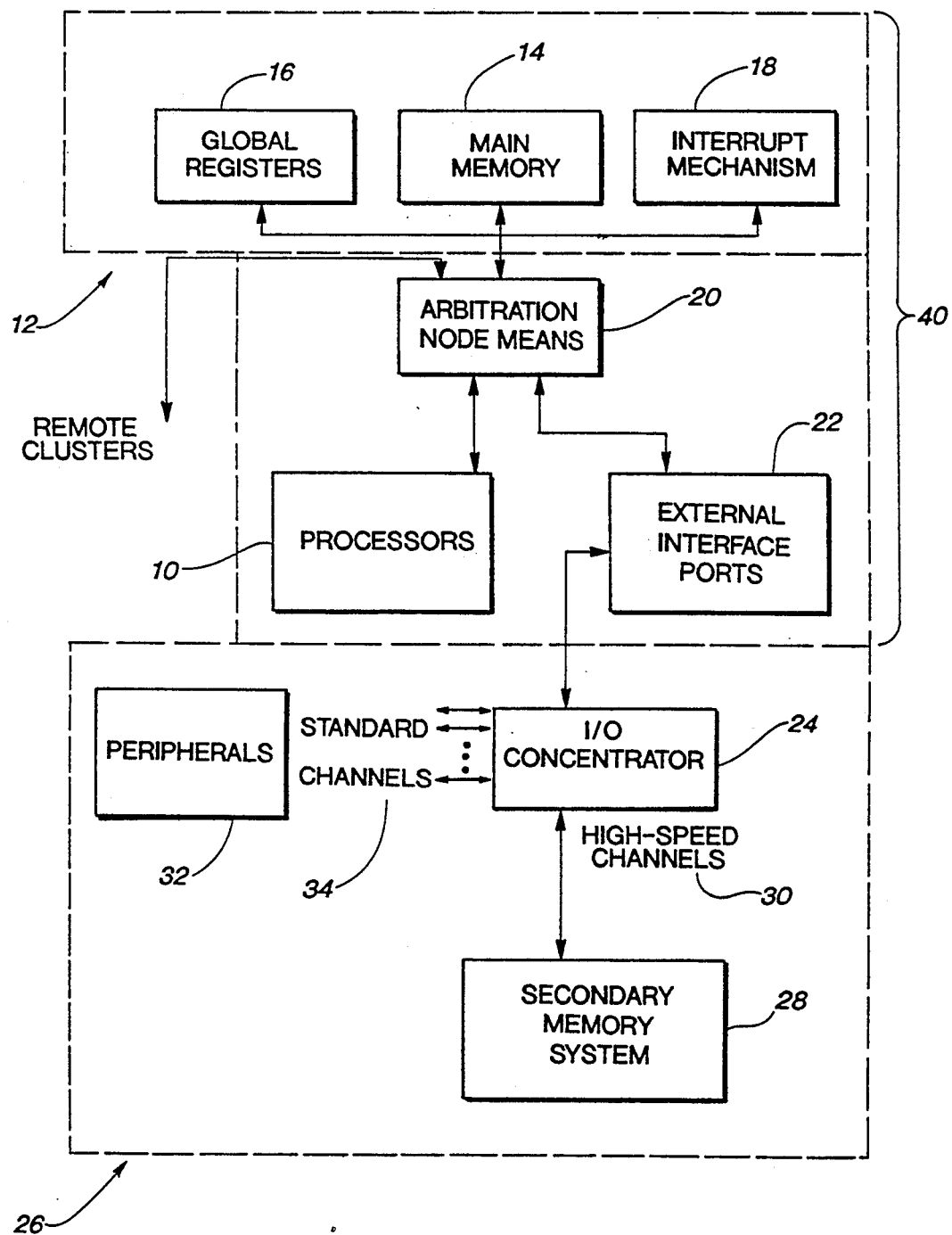
FIG. 1 is a block diagram of the various interconnections among processors external interface ports and the global registers in a single cluster of a multiprocessor system of the preferred embodiment of the present invention.
Figure 2A:
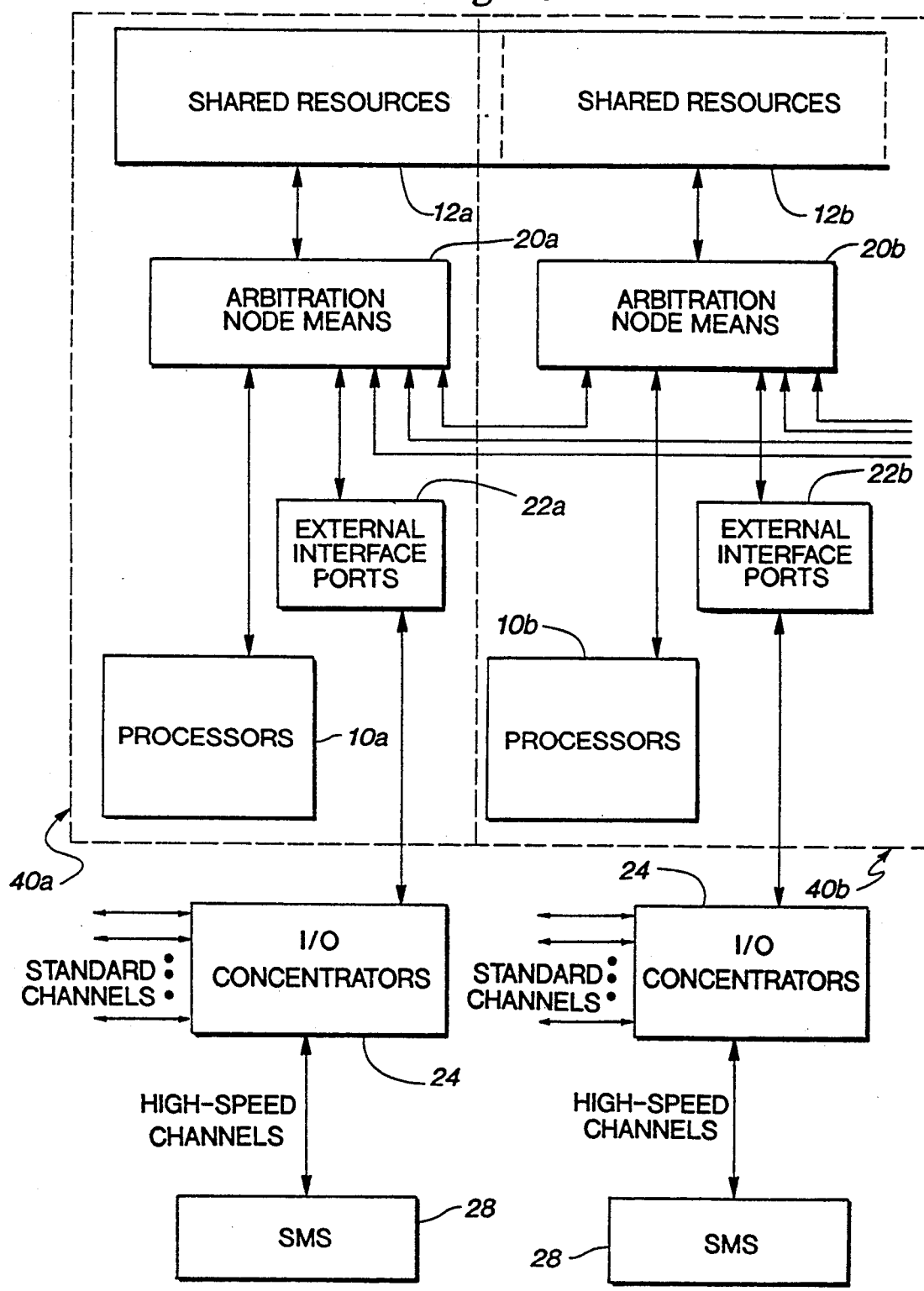
FIGS. 2a and 2b are block diagrams of a four cluster implementation of the preferred embodiment of a multiprocessor system.
Figure 2B:
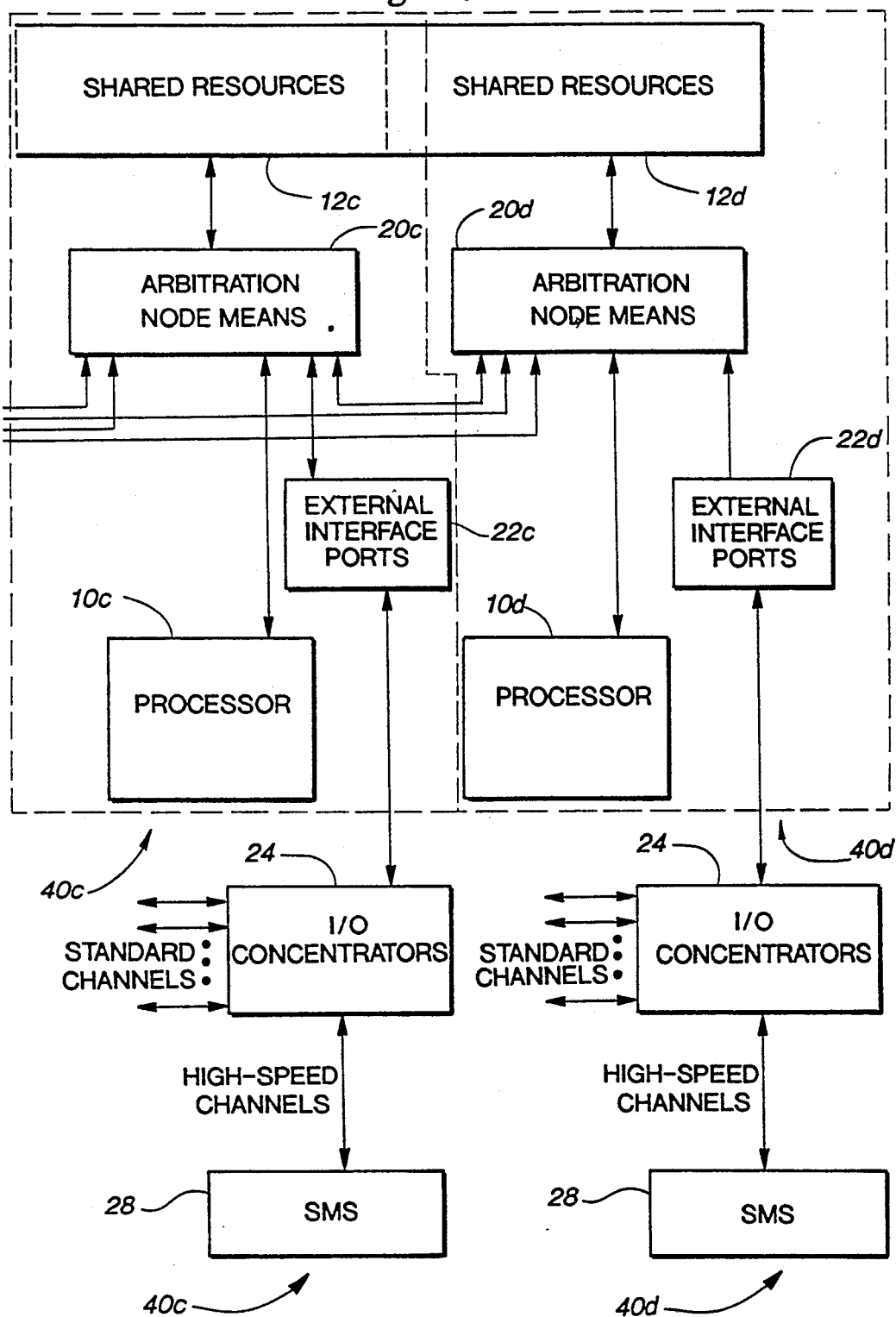

Referring now to FIG. 1, the preferred embodiment of a multiprocessor system for use with the global registers 16 of the present invention will be described. In this embodiment, the global registers 16 are used for synchronization and for sharing data among the processors 10 and external interface ports 22 of a multiprocessor computer processing system. FIG. 2 illustrates the four-cluster preferred embodiment of the multiprocessor system showing the relation among the clusters 40a, 40b, 40c and 40d. For a more detailed description of the organization of the preferred embodiment of the multiprocessor system of the clusters 40, including the processor 10, external interface ports 22 and arbitration nodes 20, reference is made to the previously identified co-pending application entitled, DISTRIBUTED INPUT/OUTPUT ARCHITECTURE FOR A MULTIPROCESSOR SYSTEM.

In the present invention, any and all processors 10 and external interface ports 22 may simultaneously access the same or different global registers 16 in any given clock cycle. The global registers 16 are physically and logically organized into global register files. References to global registers within a given global register file are serialized over a number of clock cycles and take place at the rate of one operation every clock cycle. Simultaneous references to registers in separate global register files take place in the same clock cycle. Global register logic resolves any access contention within a global register file by serially granting access to each requestor so that only one operation is performed at a time. References to a single global register within a global register file are processed in the order in which they arrive. The preferred embodiment provides addressing for a contiguous block of 32,768 global registers located among the four clusters 40. There are 8192 global registers per cluster 40. The global registers are organized within each cluster 40 as eight global register files so that accesses to different global register files can occur simultaneously.

Figure 3:
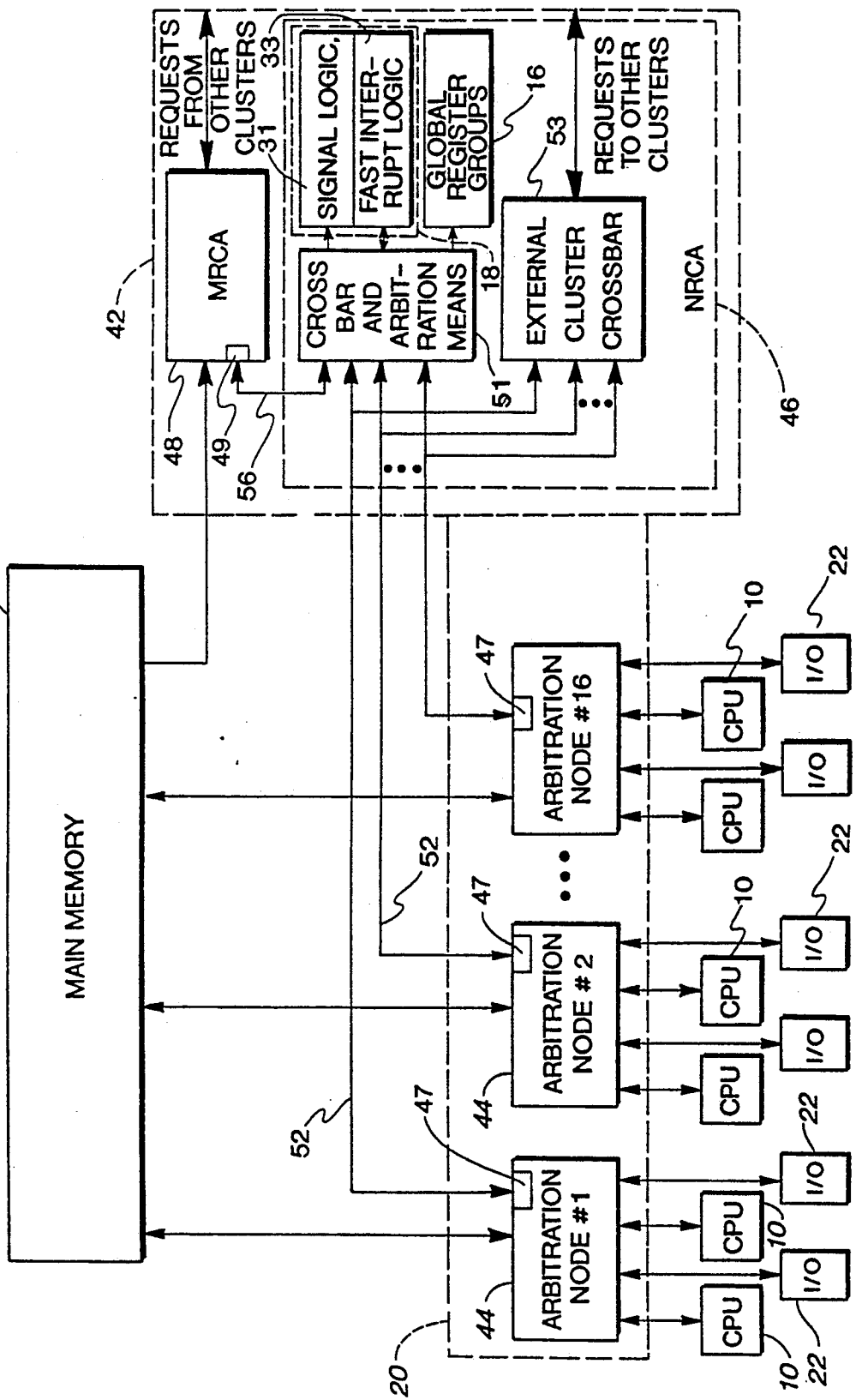
FIG. 3 is a block diagram showing the implementation of the global registers as part of the NRCA means of the preferred embodiment of the multiprocessor system.

Referring now to FIG. 3, the preferred embodiment of the global registers 16 is described. In the preferred embodiment, the global registers are associated with the logic for the NRCA means 46 in the remote cluster adapter 42. While the physical location of the global register 16 is preferably in the remote cluster adapter 42 for the preferred multiprocessor system, it will be understood that the location and global registers 16 can be accomplished by a variety of designs, depending upon the architecture and layout of the multiprocessor system that is using them.

There are sixteen NRCA ports 47 in the arbitration node means 20 (one per arbitration node 44) that provide an access path to the global registers 16 from the thirty-two processors 10 and thirty-two external interface ports 22 in a cluster 40. Each NRCA port 47 is shared by two processors 10 and two external interface ports 22 and is accessed over the path 52. A similar port 49 services inter-cluster requests for the global registers 16 in the cluster 40 as received by the MRCA means 48 and accessed over the path 56. It will be recognized that access time to global registers 16 will, in general, be slightly faster than to main memory 14 when requests reman within the same cluster 40. Also, there is no interference between in-cluster memory traffic and global register traffic because requests are communicated over different paths.

In the NRCA means 46, a cross bar/arbitration means 51 and an remote cluster crossbar 53 receive requests from the sixteen arbitration nodes 44 and the MRCA means 48. Access to the NRCA means 46 via paths 52 and 56 are routed through the cross bar/arbitration means 51 to direct the access to and from the appropriate logic in the NRCA means 46 for the global register 16 and the interrupt mechanism 18 comprised of signal logic 31 and fast interrupt logic 33. For the global registers 16, an arbitration decision requires address information to select the target register and control information to determine the operation to be peformed as described in greater detail hereinafter. This information is transmitted to the NRCA means 46 along with the data. The address and control can be for data to be sent to global registers 16 or to signal logic 31 or fast interrupt logic 33.

An important feature of the global registers 16 of the present invention is their ability to perform a read-modify-write operation in a single uninterruptable operation. This feature is used to provide atomic resource allocation mechanisms that are used by the operating system and input/output system for creating a multiprocessor system that has integrated support for distributed and multithreaded operations throughout the system as described in greater detail in the previously identified copending application entitled DISTRIBUTED INPUT/OUTPUT FOR A MULTIPROCESSOR SYSTEM. Several versions of such an atomic resource allocation mechanism are supported. The atomic global register operations are as follows:

Test and Set (TAS)—Data supplied by the originator of the request is logically ORed with data in the register, and the result is placed in the selected register. Contents of the register prior to modification are returned to the originator of the request.

Set (SET)—Data supplied by the originator of the request is logically ORed with data in the register, and the result is placed in the register.

Clear (CLR)—selected bits in the selected global register are cleared in response data supplied by the originator of the request.

Fetch and Add (FAA)—Data supplied by the originator of the request is arithmetically added to the value in the register, and the result is placed in the register. Register contents prior to the addition are returned to the originator of the request.

Fetch and Conditional Add (FCA)—Data supplied by the originator of the request is arithmetically added to the value in the register, and the result is placed in the register if the result of the add is greater than or equal to zero. If the result of the add is less than zero, the register contents are not changed. Register contents prior to the addition are returned to the originator of the request.

Add (ADD)—Data supplied by the originator of the request is arithmetically added to the value in the register, and the result is placed in the register.

Swap (SWAP)—Data supplied by the originator of the request is written into the selected register. Contents of the register prior to modification are returned to the originator of the request.

Read (READ)—Contents of the register are returned to the originator of the request.

Write (WRITE)—Data supplied by the originator of the request is written into the selected register.

Synchronization via a semaphore-like operation using the global registers 16 is accomplished by the Test and Set (TAS) instruction and a software convention to make a specific global register 16 contain semaphore information. The TAS instruction causes a number of bits to be set in a global register 16. However, before the data is modified, the contents of the global register 16 are sent back to the issuing processor 10. The processor 10 then checks to see if these bits are different than the bits originally sent. If they are different, the processor 10 has acquired the semaphore because only one register at a time can change any data in a global register 16. If the bits are the same, the software may loop back to retry the TAS operation.

Besides the obvious rapid synchronization capability required to support parallel processing, additional functionality has been designated into the global registers 16 and the overall architecture. At compilation, each process determines how many processors 10 it can use for various portions of the code. This value can be placed in its active global register set. Any free processor is, by definition, in the operating system and can search for potential work simply by changing the GMASK and GOFFSET control registers as described in further detail in connection with FIG. 8 and scanning an active process's request number.

Processors, when added to a process, decrement the processor request number. The operating system can easily add processors to a process, or pull processors from a process, based on need and usage. The fetch and conditionally add (FCA) instruction ensures that no more processors than necessary are added to a process. This instruction also facilitates the parallel loop handling capabilities of multiple processors.

Figure 4:
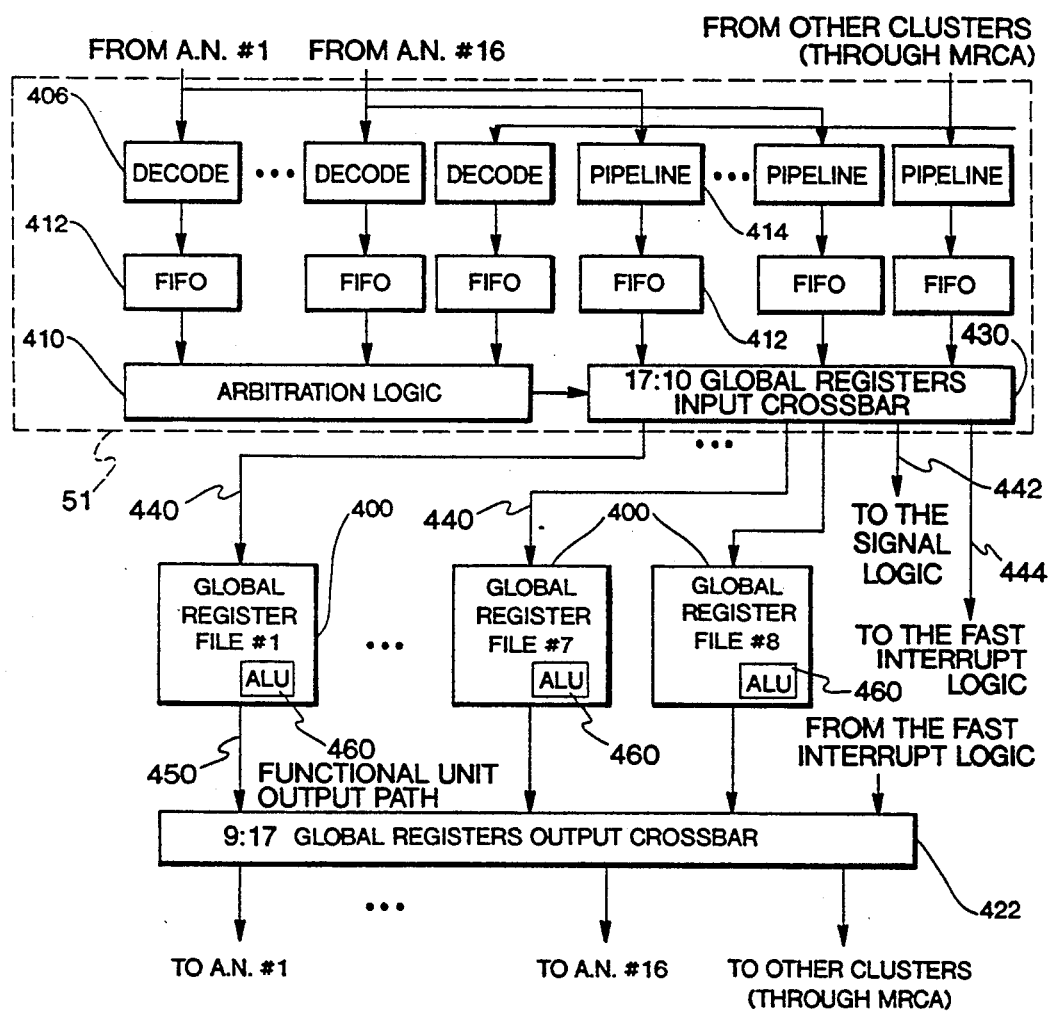
FIG. 4 is a block diagram showing the arbitration logic and cross bar switch mechanisms for the various global register files of the present invention.

Referring now to FIG. 4, the cross bar/arbitration means 51 is described in greater detail. The flow begins with data from one of the arbitration nodes 44 which has been buffered by the NRCA means 46. As each request is received at the NRCA input registers 510 (FIG. 5), decode logic 406 decodes the request to be presented to a global register arbitration network 410. If simultaneous requests come in for multiple global registers 16 in the same global register file 400, these requests are handled in a pipelined manner by the FIFO's 412, pipelines 414 and the global register arbitration network 410. Priority is assigned by FIFO (first in, first out) scheme supplemented with a multiple request toggling priority scheme. The global register arbitration network 410 uses this type of arbitration logic, or its equivalent, to prioritize simultaneous requests to the same global register file 400. When priority is determined by the arbitration network 410, a 17×10 crossbar switch means 430 matches the request in the FIFO 412 with the appropriate global register file 400. The operation of the multiple request toggling priority scheme and interrupts is described in described in detail in the appendices of the previously identified co-pending application entitled, DISTRIBUTED INPUT/OUTPUT ARCHITECTURE FOR A MULTIPROCESSOR SYSTEM. A plurality of NRCA input registers 510 (FIG. 5) provide seventeen paths into the global registers input crossbar 430. There are eight paths 440 out of the global registers input crossbar 430 to the global register files 400, one path 442 to the signal logic 31, and one path 444 to the fast interrupt logic 33. After the global register file operation is completed, global register output cross bar 422 routes any output from the operation back to the requesting port.

In the preferred embodiment shown in FIG. 4, each global register file 400 has 1024 general purpose, 64-bit registers. Each global register file 400 also contains a separate Arithmetic and Logical Unit (ALU) operation unit 460, permitting eight separate global register operations in a single clock cycle per cluster. The global register files 400 are interleaved eight ways such that referencing consecutive locations accesses a different file with each reference. In this embodiment, the global registers are implemented using a very fast 1024×64-bit RAM.

As shown in FIG. 5, address and command information travel through a pipeline 520 that is separate from the data pipeline 530. The address and command information is decoded and used to direct data and certain of the address bits to their destination. Because the results of the arbitration decisions are used to direct data to this destination, the data and arbitration results must arrive at the input crossbar 430 in the same clock cycle. Staging registers 560 are added to the data pipeline 530 to adjust the data delay to match the control delay through the address pipeline 520.

Figure 6:
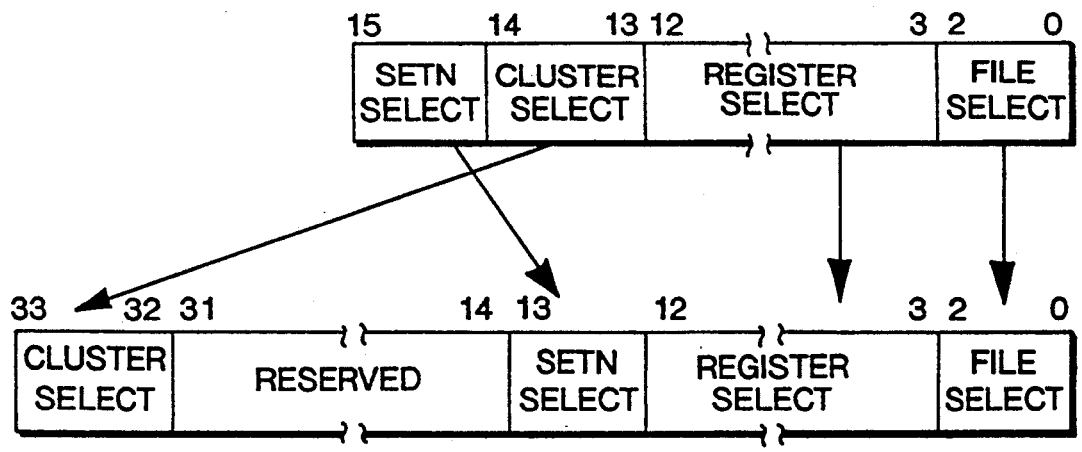
FIG. 6 is a schematic representation of the logical and physical address maps for the global registers.

As shown in FIG. 6, the arbitration is based on a decode of address bit 13 (the SETN select bit), the three address least significant bit (the global register file select bits), and a four-bit operation code (not shown). If the operation code specifies a signal operation, the address and data information are always sent to the signal logic output port 442. If address bit 13 is set to one, the address, data, and command information are sent to the fast interrupt logic output port 444. Otherwise, the address, control, and data are sent to the global register file output port selected by the three address LSB using one of the paths 440.

The other ten address bits of the logical address (bits 12-3) shown at path 540 in FIG. 5 are not used in the arbitration process. They accompany the data and are used in the functional units to select which register in the file will be modified. The command bits on path 540 are duplicated and carried through the data pipeline as well for use at the destination.

Simultaneous requests from different sources for the same global register file 400 (or for the signal logic 31 or the fast interrupt logic 33) are resolved by the arbitration logic 410 by granting one of the requestors access and delaying any other requests to later cycles. The arbitration address pipeline registers 520 hold any requests that cannot be immediately serviced in the Address Pipeline FIFO 570. In any single Data Pipeline FIFO 580. The data are submitted serially. Similarly, requests in the Address Pipeline FIFO 570 are handled serially. For example, data B entered later cannot pass data A entered before it. Although data A may be waiting for a busy global register, and data B may be waiting for an available global register, data B can not be processed until data A is finished. Data stays in order within a single queue; no data under Address Control can slip ahead of the data order in Data Address Control.

Ten arbitrations can be handled simultaneously by the arbitration logic 410. If data cannot go, signals 512 and 514 are sent to FIFOs 570 and 580, respectively, instructing them to hold the request at their respective outputs. The FIFOs 570 and 580 then wait for their arbitration decision. Signals (not shown) are sent back to each requestor from the arbitration logic 410 indicating that a request has been removed from the FIFOs 570 and 580. The source uses this signal to determine when the FIFOs 570 and 580 are full. The source stops sending requests when the FIFOs 570 and 580 are full so that no requests are lost. Once an arbitration decision is made, a multiplex select signal 590 is generated that steres the input cross bar 430. This automatically unloads the FIFOs 570 and 580 and sends data to the global register files 400 or the signal logic 31 or the fast interrupt logic 33.

The input crossbar 430 is implemented as ten, 17:1 multiplexors. There is one multiplexor for each of the eight output paths 440, and output paths 442 and 444. The multiplexors are controlled by multiplexed select signals 590 from the arbitration logic. The arbitration logic 410 also sends a signal to alert the NRCA means 46 (FIG. 3) that data will be returning to the source via the functional unit output path 450 (FIG. 4). Once the request is granted access, data will return to the NRCA means 46 in a fixed number of cycles. The NRCA logic relies on this fixed interval to determine when to receive the data from the global registers 16 and return it to the processor 10. Data is returned through a 9:17 Global Registers Output Crossbar 422 (signal logic does not return data).

Figure 7A:
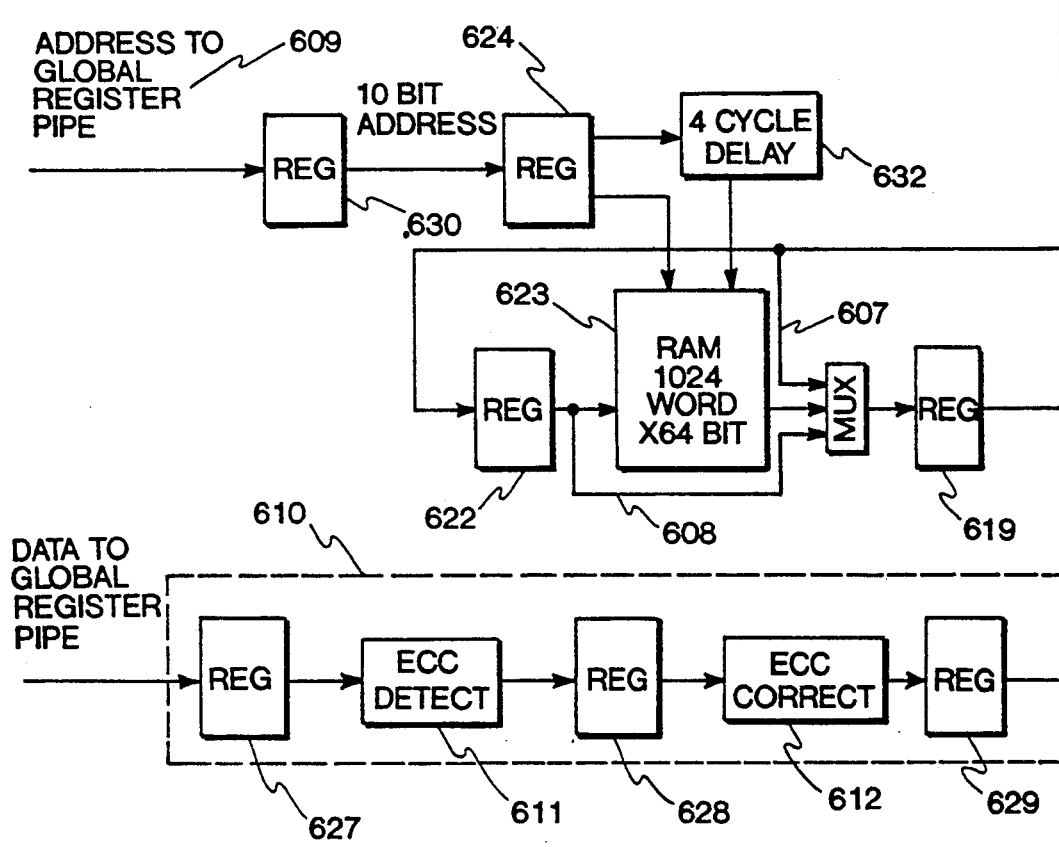
FIGS. 7–7b are more detailed block diagrams of FIG. 4 showing the address and data lines for a single global register file and the arithmetic logical unit associated with that global register file.
Figure 7:
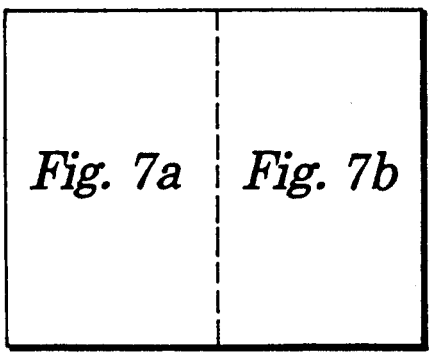

Referring now to FIG. 7, the operation of a single global register file 400 will be described. Data associated with a requested operation enters the global register file 400 through the data to global register pipe 610. Data travels through to global register pipe 610 in four steps. Each of the steps requires a single clock cycle. The four steps in the data to global register pipe 610 are as follows:

1. Load data from the arbitration input crossbar 430 in FIG. 5 into the data pipe input register 627.
2. Perform error detection and load the data into the detection output register 628
3. Perform error correction and load data into the correction output register 629
4. Move the data to the data pipeline output register 626.

The register address information associated with a requested operation enters through the address pipe 609. Addresses pas through the pipe in two steps. Each step requires a single clock cycle. The two steps in the address pipe 609 are as follows:

1. Load data from the arbitration input crossbar 430 into the address pipe input register 630.
2. Move the address to the register file read address register 624.

The address information is used to fetch data from the register file 623. The fetched data is modified by combining it with data from the global register pipe 610 in the ALU 430. The modified data is then written back into the register file 623. If the specified operation requires that data be returned to the requestor, the data first fetched from the file 623 is delivered to the NRCA logic via the functional unit output register 631.

The ALU 460 consists of a primary adder 602, a wrap adder 603, and a logical unit 604. These three elements can take two operands from three sources. The primary adder takes one operand from either the file output latch 619 or the ALU output latch 621 via latch 620 and the second operand from the data pipeline output register 626. The wrap adder takes one operand from the ALU output latch 621 via latch 620 and the other from the data pipeline output register 626. The logical unit takes one operand from either the file output latch 619 or the ALU output latch 621 via latch 620 and the second operand from the data pipeline output register 626.

Five clock cycles are required to read a register in the file 623, operate on the data in the ALU 460, and return data to the register. Each of the steps requires a single clock cycle. The five steps are listed:
1. Read the register file 623, load data into the file output latch 619.
2. Move data into the ALU input latch 620
3. Perform the requested operation, using the primary adder 602 or the logical unit 604, load data into the ALU output latch 621
4. Move data into the file input latch 622
5. Store data back into the selected register in the file 623.

The address delay unit 632 delays the read address used in step 1 by four cycles so that it will be available to use when the modified data is written back to the file 623 in step 5. The address delay unit 632 is loaded from the register file read address register 624 at the end of step 1.

This sequence is followed whenever requests for access to the same register are received no faster than once in five cycles. A second operation on the same register initiated after step 5 above will follow the same sequence.

If requests for access to the same register in the file 623 are received on consecutive clock cycles, a different sequence is followed to ensure that the second operation takes place using the results of the first operation, even though the results of the first operation have not been written back to file 623 at the time the second operation takes place. This sequence of operations for consecutive accesses to the same register is as follows:
1. Read the register file 623, load data into the file output latch 619
2. Move data into the ALU input latch 620
3. Perform the first requested operation, using the primary adder 602 or the logical unit 604, load data into the ALU output latch 621
4. Perform the second requested operation, using the wrap adder 603 or the logical unit 604, load data into the ALU output latch 621
5. Move data into the file input latch 622
6. Store data back into the selected register in the file 623

In the preceding sequence, if the logical unit 604 is used, data is taken from the ALU input latch 620 in step 3 but is taken from the ALU output latch 621 in step 4. Selection is made by the logical input mux 625. If an adder is required in the second operation, the wrap adder 603 is used in step 4 because it takes data from the ALU output latch 621. This method ensures that data resulting from the first operation is used in the second operation.

If two requests to the same register are received in a three cycle period separated by a single cycle, the following sequence is used:
1. Read the register file 623, load data into the file output latch 619
2. Move data into the ALU input latch 620
3. Perform the first requested operation, using the primary adder 602 or the logical unit 604, load data into the ALU output latch 621
4. Move data to the ALU input latch 620 via path 606.
5. Perform the second requested operation, using the primary adder 602 or the logical unit 604, load data into the ALU output latch 621
6. Move data into the file input latch 622
7. Store data back into the selected register in the file 623

In the preceding sequence, if the logical unit 604 is used, data is taken from the ALU input latch 620 in steps 3 and 5. This method ensures that data resulting from the first operation is used in the second operation.

If two requests to the same register are received in a four cycle period separated by two cycles, the following sequence is used:
1. Read the register file 623, load data into the file output latch 619
2. Move data into the ALU input latch 620
3. Perform the first requested operation, using the primary adder 602 or the logical unit 604, load data into the ALU output latch 621
4. Load data into the file output latch 619 via path 607
5. Move data to the ALU input latch 620
6. Perform the second requested operation, using the primary adder 602 or the logical unit 604, load data into the ALU output latch 621
7. Move data into the file input latch 622
8. Store data back into the selected register in the file 623

In the preceding sequence, if the logical unit 604 is used, data is taken from the ALU input latch 620 in both steps 3 and 6. This method ensures that data resulting from the first operation is used in the second operation.

If two requests to the same register are received in a five cycle period separated by a there cycles, the following sequence is used:
1. Read the register file 623, load data into the file output latch 619
2. Move data into the ALU input latch 620
3. Perform the first requested operation, using the primary adder 602 or the logical unit 604, load data into the ALU output latch 621
4. Move data to the ALU input latch 622
5. Load data into the file output latch 619 via path 608
6. Move data to the ALU input latch 620
7. Perform the second requested operation, using the primary adder 602 or the logical unit 604, load data into the ALU output latch 621
8. Move data into the file input latch 622
9. Store data back into the selected register in the file 623

In the preceding sequence, if the logical unit 604 is used, data is taken from the ALU input latch 620 in both steps 3 and 7. This method ensures that data resulting from the first operation is used in the second operation.

Data returning to the requestor follows one of four paths to the output, depending on the location of the requested data word in the operation pipeline at the time the request is made. Normally, the requested data word will be located in the register file 623. The sequence of steps to move the contents of the selected register is shown below. Each step requires a single clock cycle:
1. Read the register file 623, load data into the file output latch 619
2. Move data into the primary exit register 633 via path 613.
3. Compute and append ECC syndrome bits, load data and syndrome bits into the primary ECC output register 634
4. Move data and syndrome bits to the functional unit output register 631 via path 617

5. Return data and syndrome bits to the NRCA through the global register output cross bar 422 and, through further steps, to the requestor.

If the requested data word has been modified by an operation in the immediately preceding cycle, the following steps are used:
1. Move the previous contents of the referenced register into the ALU input latch 620
2. Perform the previously requested operation, move the data into the ALU output latch 621. This step computes the data that has been requested by the current fetch operation
3. Move data into the alternate exit register 635 via path 638
4. Compute and append ECC syndrome bits, load data and syndrome bits into the functional unit output register 631 via path 639
5. Return data and syndrome bits to the NRCA through the global register output cross bar 422 and through further steps to the requestor.

If the requested data word has been modified by an two cycles earlier, the following steps are used:
1. Perform the previously requested operation, move the data into the ALU output latch 621. This step computes the data that has been requested by the current fetch operation.
2. Move data into the alternate exit register 635 via path 638
3. Compute and append ECC syndrome bits, load data and syndrome bits into the first staging register 636.
4. Move data and syndrome bits to the functional unit output register 631 via path 640.
5. Return data and syndrome bits to the NRCA through the global register output cross bar 422 and, through further steps, to the requestor.

If the requested data word has been modified by an operation three cycles earlier, the following steps are used:
1. Move data from the ALU output latch 621 into the alternate exit register 635 via path 638.
2. Compute and append ECC syndrome bits, load data and syndrome bits into the first staging register 636.
3. Move data and syndrome bits into the second staging register 637.
4. Move data and syndrome bits to the functional unit output register 631 via path 616
5. Return data and syndrome bits to the NRCA through the global register output cross bar 422 and, through further steps, to the requestor.

If the requested data word has been modified by an operation four cycles earlier, the following steps are used:
1. Move data from the previously requested operation from the file input latch 622 into the file output latch 619.
2. Move data into the primary exit register 633 via path 613.
3. Compute and append ECC syndrome bits, load data and syndrome bits into the primary ECC output register 634.
4. Move data and syndrome bits to the functional unit output register 631 via path 617.
5. Return data and syndrome bits to the NRCA through the global register output cross bar 422 and, through further steps, to the requestor.

If the requested data was modified more that four cycles earlier, the normal fetch sequence is used.

The embodiment ensures that any global register operation is completed before another request can be initiated on the same register, giving the appearance that the operation has completed in a single cycle even though multiple cycles are actually required. The pipelined organization allows a new operation to be initiated in the functional unit every cycle, regardless of prior activity. This pipelining, in combination with multiple, parallel paths to multiple functional units, results in the best possible throughput, and hence, the most efficient means for supporting synchronization variables among multiple parallel processes.

Referring now to FIG. 6, the method for accessing the global registers 16 is illustrated. Two methods are shown. The logical address map 710 is used by the processor 10. The physical address map 720 is used by the IOC 24.

Figure 8:
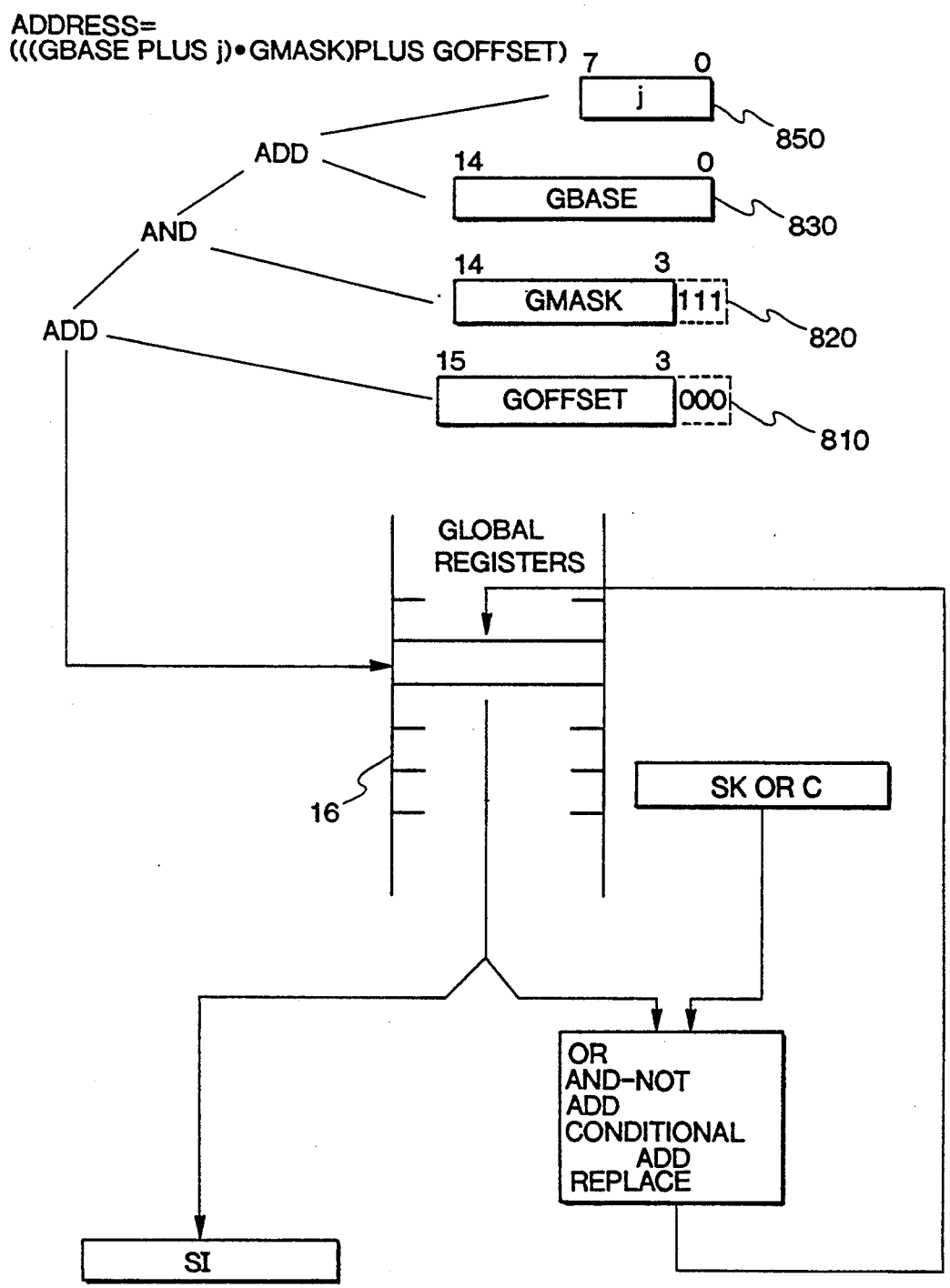
FIG. 8 is a schematic representation showing the global register addressing.

FIG. 8 illustrates the global register calculation in the processor 10. The present invention uses a relative addressing scheme for the global registers 16 to eliminate the need for explicitly coding of global register addresses in the user's program. Global register address calculations are based on the contents of three processor control registers: GOFFSET 810, GMASK 820 and GBASE 830. Setting GMASK 820 to all ones permits the user to access all of the available global registers 16. GOFFSET 810 and GMASK 820 are protected registers that can be written only by the operating system. Together they define a segment of the collection of global registers 16 that the processor 10 or IOC 24 can address. The three least-significant bits of GOFFSET 810 are assumed to be zero when the address calculation is performed, and the three least-significant bits of GMASK 820 are assumed to be ones.

GBASE 830 is a user-accessible 15-bit register. The value contained in the instruction j field 850 is added to GBASE 830 to form the user address. The j field 850 is considered to be unsigned, and any carry out is ignored. The sum of GBASE 830 and the instruction j filed 850 is logically ANDed wit the contents of GMASK 820, placing a limit on the maximum displacement into the register set that the user can address. The result of the mask operation is added to the contents of GOFFSET 810. Any carry out is ignored. It should be noted that the two most significant bits of the resulting 15-bit sum are used to select which cluster 40 is accessed. A carry that propagates into the upper two bits as a result of either of the add operations will change the cluster select bits. Note that GOFFSET 810 is a 16-bit register. The 16th bit is used to select the SETN registers associated with the fast interrupt logic 33 and must be zero when accessing the global registers 16. For a more detailed description of the fast interrupt logic 33, reference is made to the appendices in the previously identified co-pending application entitled, DISTRIBUTED INPUT/OUTPUT ARCHITECTURE FOR A MULTIPROCESSOR SYSTEM.

The address generated by this method allows access to the set of global registers 16 that the operating system assigns any particular processor. All processors 10 could be assigned to one particular set or to different sets of global registers 16, depending on the application and availability of processors. It will be understood that logic in the processor means 10 rearranges the logical address 710 into the physical address 720 used at the NRCA means 46, as shown in the mapping in FIG. 7. It should be noted that address values which specify a binary one in bit position 13 of 720 will address the SETN registers, rather than the global registers 16.

The IOC 24 can also perform global register operations. The operating system reserves for itself any number of global register sets that will be used for parameter passing, interrupt handling, synchronization and input/output control. In the preferred embodiment, the peripherals 32 attached to the various IOCs 24 contain part of the operating system software and are able to access all of the global registers 16 in all clusters 40. For a more detailed description of how the operating can use the global registers 16, reference is made to the previously identified co-pending application entitled, DISTRIBUTED INPUT/OUTPUT ARCHITECTURE FOR A MULTIPROCESSOR SYSTEM.

Although the description of the preferred embodiment has been presented, it is contemplated that various changes could be made without deviating from the spirit of the present invention. Accordingly, it is intended that the scope of the present invention be dictated by the appended claims rather than by the description of the preferred embodiment.

We claim:

1. A system of global registers for a multiprocessor system comprising:
    a plurality of global register files, each global register file containing a plurality of global register means for storing data;
    two or more requestors in the multiprocessor system, each requestor having a processor with an instruction decode means for decoding a plurality of instructions, at least one of which comprises a request to the system of global registers, each request comprising information supplied by the requestor, including:
        an address specifying a selected global register file and a selected
        global register means,
            a data value, and
            an operation command specifying an operation to be performed
        on the selected global register means using the data value;
    a plurality of access path means operably connected between the requestors and the global register files for transferring one or more requests to and from the global register files from one or ore requestors in the multiprocessor system,
    a plurality of switch means operably connected to the global register files and the access path means for routing the requests to the selected global register file and the selected global register means within the global register file in response to the address contained in the request and for routing data from the selected global register file and the selected global register means to be returned to the requestor; and
    for each global register file, an arithmetic and logical unit means operably connected to that global register file for performing arithmetic and logical operations on the selected global register means associated with that global register file and the data value in response to the operation command contained in the request.

2. The system of global registers of claim 1 wherein one of the arithmetic and logical operations to be performed by the arithmetic and logical unit means is a fetch and conditional add instruction.

3. The system of global registers of claim 1 wherein the access path means further comprises arbitration means for determining the priority among multiple requests for the same global register file.

4. The system of global registers of claim 1 wherein at least one of the arithmetic and logical operations to be performed by the arithmetic and logic unit means is an atomic resource allocation operation in the form of an uninterrupted read-modify-write operation.

5. The system of global registers of claim 1 wherein the multiprocessor system is a highly parallel multiprocessor systems organized as a plurality of clusters, each cluster including a plurality of requestors comprised of a plurality of processors and a plurality of input/output controllers which are operably connected to a unique subset of the set of global registers and wherein each subset of global registers ma be accessed both by the requestors within and without the cluster associated that subset of global registers.

6. The system of global registers of claim 1 wherein the requestors are comprised of a plurality of processors and a plurality of input/output controllers that comprise the multiprocessor system.

7. The system of global registers of claim 6 wherein the address generated by the processors is comprised of a base address, a mask address, an offset address and an instruction field value.

8. The system of global registers of claim 7 wherein an operating system for the multiprocessor system assigns the processors to a process by assigning a unique set of global registers to a process by specifying the offset address and mask address for the process.

9. The system of global registers of claim 1 wherein the access path means is comprised of an address pipe means for transferring the address and command and a data pipe means for transferring the data.

10. The system of global registers of claim 1 wherein the global registers are capable of pipelining multiple parallel requests on consecutive clock cycles of the multiprocessor system.

11. A system of global registers for a multiprocessor system having two or more processors for making requests to a selected set of global registers, each request comprising information supplied by the requestor, including an address specifying the selected set of global registers, a data value, and an operation command specifying an operation to be performed on the selected set of global registers using the data value, the address being comprised of a base address, a mask address, and an offset address such that an operating system program for the multiprocessor system assigns a set of global registers to a process by specifying the offset address and mask address for the process, the system of global registers comprising:
    a plurality of global register files, each global register file containing a plurality of global register means for storing data;
    a plurality of access path means operably connected between the requestors and the global register files for transferring one or more requests to and from the global register files from the processors in the multiprocessor system, the access path means including:
        arbitration means for determining the priority among multiple requests for the same global register file;

address pipe means for transferring the address and command; and data pipe means for transferring the data;

a plurality of switch means operably connected the global register files and the access path means for routing the requests to the selected global register file and the selected global register means within the global register file in response to the address contained in the request and for routing data from the selected global register file and the selected global register means to be returned to the processor; and arithmetic and logical unit means operably connected to each global register file for performing arithmetic and logical operations in the form of atomic operations on the selected global register means associated with that global register file and the data value in response to the operation command contained in the request, such that the sets of global registers are capable of pipelining multiple parallel requests on consecutive clock cycles of the multiprocessor system.

12. The system of global registers of claim 11 wherein the multiprocessor system is a highly parallel multiprocessor systems organized as a plurality of clusters, each cluster including a plurality of processors which are operably connected to a unique subset of the set of global registers and wherein each subset of global registers may be accessed both by the processors within and without the cluster associated that subset of global registers.

* * * * *

UNITED STATES PATENT AND TRADEMARK OFFICE
CERTIFICATE OF CORRECTION

PATENT NO. : 5,165,038

DATED : November 17, 1992

INVENTOR(S) : Douglas R. Beard et al.

It is certified that error appears in the above-indentified patent and that said Letters Patent is hereby corrected as shown below:

Column 1, Line 14, please delete "relates" and insert --related-- therefore.

Column 1, Line 26, please delete "coupler" and insert --computer-- therefore.

Column 1, Line 58, please delete "requires" and insert --requests-- therefore.

Column 1, Line 63, please delete "mots" and insert --most-- therefore.

Column 2, Line 28, please delete "distribute" and insert --distributed-- therefore.

Column 3, Line 45, please delete "system of" and insert --system in-- therefore.

Figure 5A:
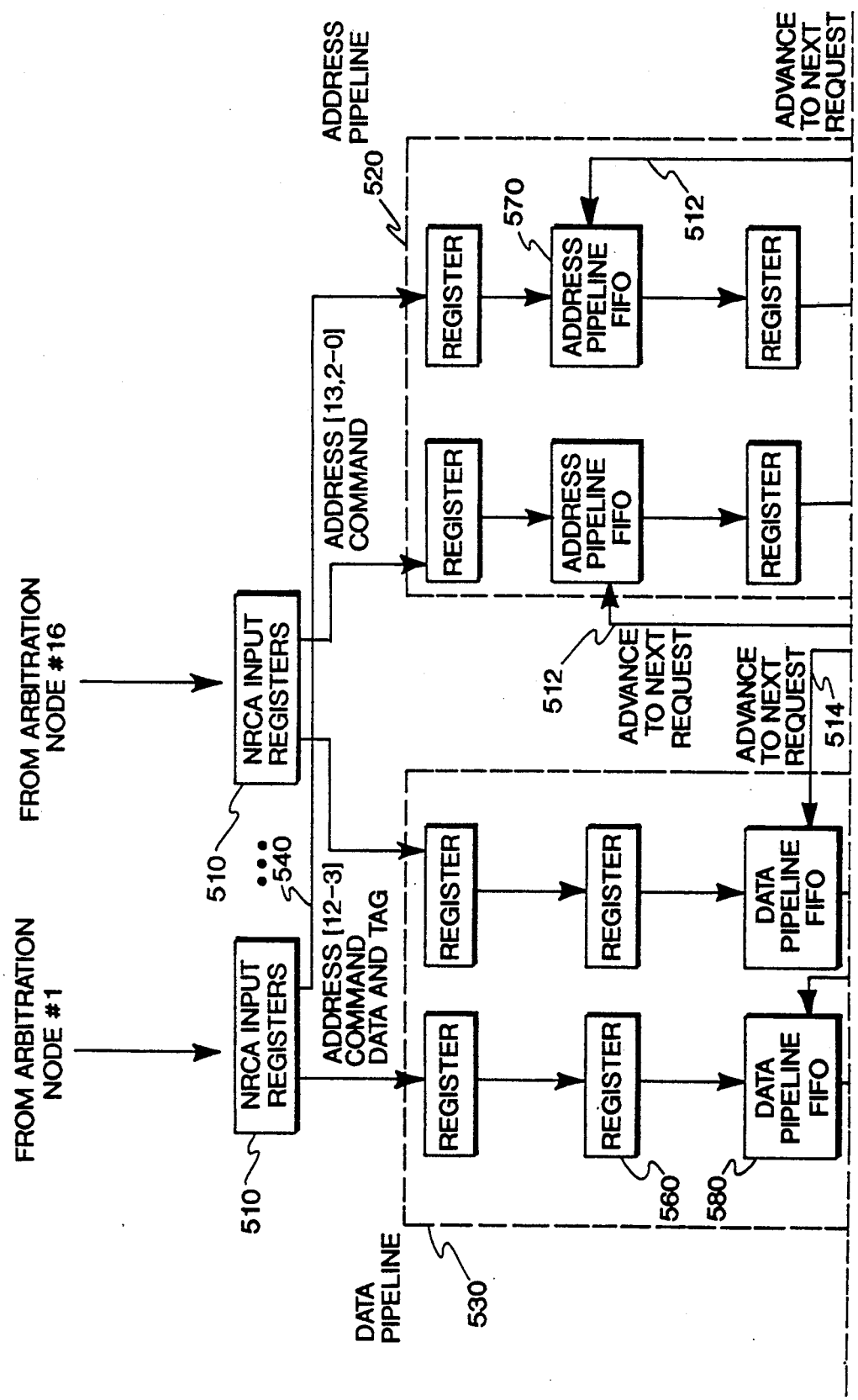
FIGS. 5–5b are more detailed block diagrams of FIG. 4 showing the data and address pipelines for the global registers.

Column 3, Line 58, please delete "FIGS. 5-5b" and insert --FIGS 5, 5a and 5b-- therefore.

Figure 7B:
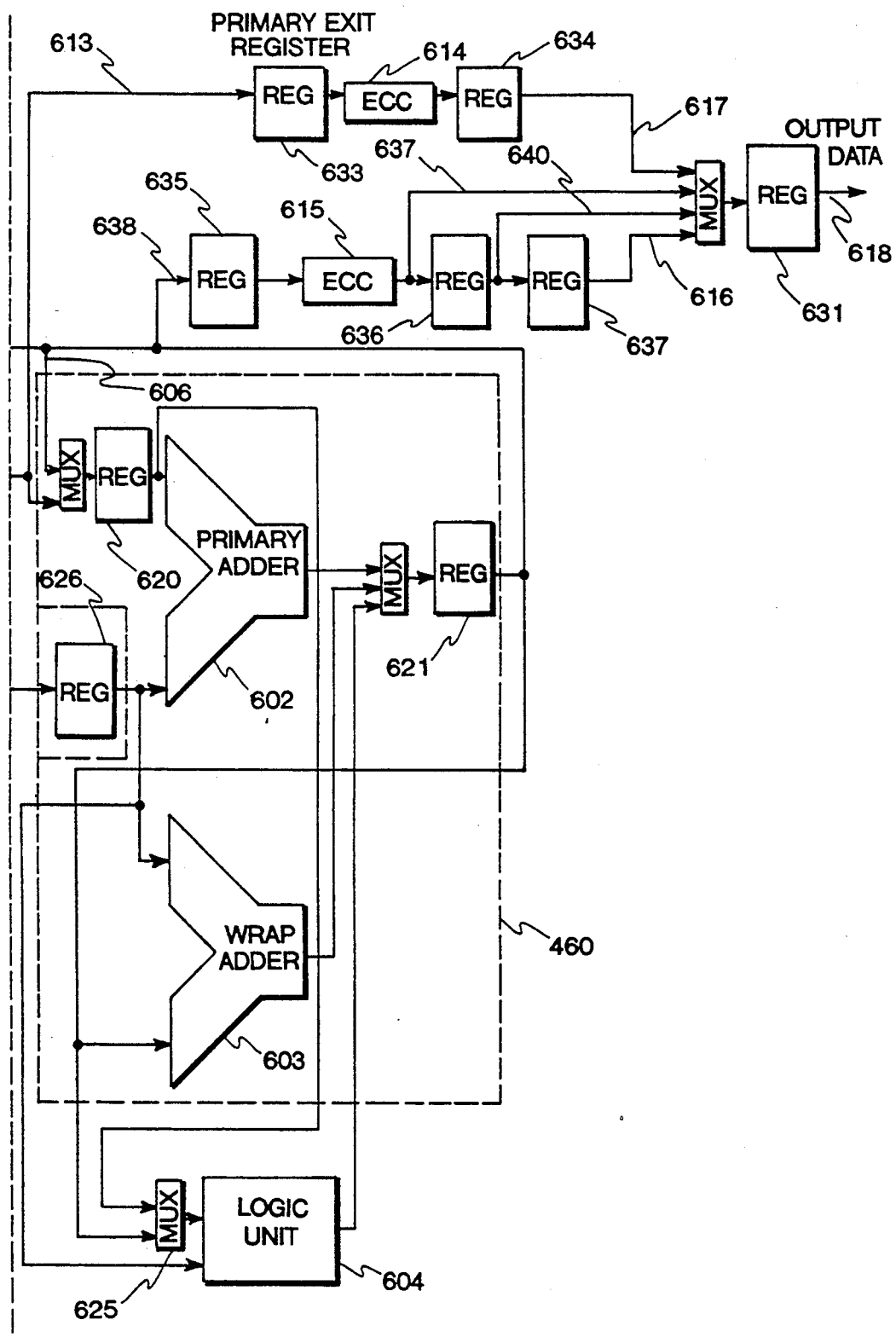

Under Column 3, Line 63, please delete "FIGS. 7-7b" and insert --FIGS 7, 7a and 7b-- therefore.

Column 4, Line 67, please delete "reman" and insert --remain-- therefore.

Column 5, Line 44, please delete "response data" and insert --response to data-- therefore.

Column 6, Line 26, please delete "process's request" and insert --processor's processor request-- therefore.

Column 7, Line 50, please delete "580. The" and insert --580, the-- therefore.

Column 8, Line 5, please delete "steres" and insert --steers-- therefore.

UNITED STATES PATENT AND TRADEMARK OFFICE
CERTIFICATE OF CORRECTION

PATENT NO. : 5,165,038

DATED : November 17, 1992

INVENTOR(S) : Douglas R. Beard et al.

It is certified that error appears in the above-indentified patent and that said Letters Patent is hereby corrected as shown below:

Column 5, Lines 65 + 66, please insert --A more detailed description of each of these instructions is set forth in Apppendix A which is attached hereto and incorporated by references.-- therefore.

Column 8, Line 42, please delete "pas" and insert --pass-- therefore.

Column 10, Line 30, please delete "there" and insert --three-- therefore.

Column 10, Line 38, please delete "the ALU input" and insert --the file input-- therefore.

Column 11, Lines 21 + 22, please delete "an two cycles" and insert --an operation two cycles-- therefore.

Column 12, Line 23, please delete "explicitly" and insert --explicit-- therefore.

Column 13, Line 49, please delete "ore" and insert --more-- therefore.

Column 14, Line 19, please delete "ma be" and insert --may be-- therefore.

Signed and Sealed this

Fourth Day of June, 1996

Attest:

BRUCE LEHMAN

*Attesting Officer*   *Commissioner of Patents and Trademarks*